United States Patent [19]

Hauber et al.

[11] 4,341,680
[45] Jul. 27, 1982

[54] WATER-SOLUBLE, PRESSURE SENSITIVE, SELF-ADHESIVE, COMPOSITION, METHOD OF MANUFACTURE THEREOF, AND TAPES PRODUCED THEREWITH

[75] Inventors: Rüdiger Hauber; Günter Guse, both of Hamburg, Fed. Rep. of Germany

[73] Assignee: Beiersdorf Aktiengesellschaft, Fed. Rep. of Germany

[21] Appl. No.: 118,130

[22] Filed: Feb. 4, 1980

[30] Foreign Application Priority Data

Feb. 5, 1979 [DE] Fed. Rep. of Germany ....... 2904233

[51] Int. Cl.$^3$ ............................................. C08L 31/00
[52] U.S. Cl. ..................................... 525/329; 524/560
[58] Field of Search .................. 260/29.6 N, 29.6 MN

[56] References Cited

U.S. PATENT DOCUMENTS 3,441,430 4/1969 Peterson ............................ 117/68.5
3,865,770 2/1975 Blake ................................. 260/27 R
4,002,785 1/1977 Grossmann et al. .......... 260/29.6 N

FOREIGN PATENT DOCUMENTS 2360441 of 0000 Fed. Rep. of Germany .

Primary Examiner—John Kight, III
Assistant Examiner—Amelia B. Yarbrough
Attorney, Agent, or Firm—Linda G. Bierman; Jordan B. Bierman

[57] ABSTRACT

A water-soluble, pressure sensitive, self-adhesive composition comprising a mixture of
(a) a copolymer comprising 70 to 80 parts by weight of monomeric ethyl acrylate and 20 to 30 parts by weight of a monomeric, α, β unsaturated aliphatic monocarboxylic acid and
(b) a tertiary, ethoxylated N-alkyl alkane diamine having 3 to 18 ethylene oxide units per molecule, said alkyl having 10 to 18 carbon atoms, from 50% to 90% of the acid groups of said acid being neutralized. A method of preparation of the composition and an adhesive tape made therewith are also disclosed.

14 Claims, No Drawings

WATER-SOLUBLE, PRESSURE SENSITIVE, SELF-ADHESIVE, COMPOSITION, METHOD OF MANUFACTURE THEREOF, AND TAPES PRODUCED THEREWITH

The priority of German application No. P 29 04 233.9, filed Feb. 5, 1979, is hereby claimed.

The present invention is directed to a composition useful in the preparation of a special type of adhesive tape which is intended to dissolve fully in water. Such tapes are used in the manufacture and modification of papers. In this field, it is customary to join the end of one roll to the beginning of the next roll. This enables the manufacturer to run the machines on a continuous basis. This is generally known as making the paper webs endless.

In addition, if defective areas must be cut out, the free ends of the web are joined together to complete the processing. After the manufacture of the paper is finished, or the modification process completed, the attachment points containing the adhesive tape are removed. These cut out areas are not destroyed, but are returned to the pulp for reprocessing.

As a result, a self-adhesive tape is required wherein the adhesive composition is adhered easily and quickly to the paper with minimum contact pressure. Furthermore, it must hold the web ends together throughout the further operations. Moreover, to facilitate reprocessing, the tape should consist of an easily disintegratable support containing no wet strength agents and also comprise a water-soluble adhesive layer applied on one or both sides. The adhesive should dissolve in the water, leaving no residue, and the remaining material is preferably pure cellulose which will blend in the remaining pulp being recycled.

In the past, a number of different compositions of such adhesives have been developed and proposed for this purpose. They consist, for example, of a mixture of polyvinyl alcohol and polyethylene imine with or without the addition of an acid (German patent 1 594 190), of polyvinyl pyrrolidone with the addition of polyglycols (U.S. Pat. No. 3,096,202), of polyacrylic acid with water-soluble plasticizers such as polyethylene glycol or polypropylene glycol (U.S. Pat. No. 2,838,421), of a mixture of a partial ester of vinylmethyl ether-maleic acid anhydride copolymer with an alkyl phenoxypolyglycol ether and unreacted alkyl phenoxypolyglycol ethers as plasticizers (German Patent No. 2 311 746), of ethoxylated polyvinyl alcohols and polyvinyl methyl ether (German Patent No. 2 142 770), of acrylic acid-ether ester acrylate copolymers and a liquid water-soluble plasticizer containing at least one ether bond (U.S. Pat. No. 3,441,430), or of acrylic acid-acrylic acid ester copolymers with alkanolamines for neutralization of the acrylic acid, optionally with the addition of plasticizing polyoxyethylene compounds and/or tackifying reaction products of acid resins with alkanol amines (DOS No. 2 360 441).

These various self-adhesive compositions constitute a substantial improvement over the usual water-insoluble self-adhesive compositions based on natural rubber and acrylic acid ester copolymers with respect to their ability for making paper webs endless. However, they have certain shortcomings which limit their possibilities for use. Practical tests have demonstrated that either their tack is too low or their cohesion is insufficient. Furthermore, even the so-called "water-soluble" compositions are frequently only partly soluble; that is, they partially dissolve in water upon mechanical treatment and the remainder of the residue is merely dispersed. Moreover, these compositions dissolve or are dispersed only in an alkaline to neutral aqueous medium. They are insoluble even in the weakly acid range (pH 3 to 6).

It is, therefore, one of the objects of the present invention to provide a pressure-sensitive self-adhesive composition useful for making paper webs endless. However, this composition must also overcome the aforementioned disadvantages of the known "water-soluble" self-adhesive compositions of the prior art. In addition, it must demonstrate excellent tack and good cohesion, as well as possess the property of dissolving in water completely, without leaving any residue and without the necessity of mechanical treatment. This property must exist in both the alkaline to neutral and in the acid range (to about pH 0.5).

It has been found that the desired combination of properties can be obtained by the use of the compositions of the present invention. Water-soluble, self-adhesive materials are obtained which adhere immediately and firmly to the web and are eminenetly suitable for making paper webs endless, even when different types of paper are used. In broad outline, the composition consists of a mixture of a copolymer of ethyl acrylate and $\alpha, \beta$ unsaturated, monocarboxylic acid with a tertiary ethoxylated N-alkyl alkane diamine having a specific range of ethylene oxide units and carbon atoms in the molecule. From 50% to 90% of the acid groups of the acid component of the copolymer must be neutralized. The result is a water-soluble, pressure-sensitive, self-adhesive composition which can be applied in aqueous, alkali-containing, viscous solution to a range of substrates.

The composition of the present invention comprises a mixture of
(a) a copolymer of 70 to 80 parts by weight of monomeric ethyl acrylate and 20 to 30 parts by weight of a monomeric $\alpha, \beta$ unsaturated aliphatic monocarboxylic acid and
(b) a tertiary ethoxylated N-alkyl alkane diamine having 3 to 18 ethylene oxide units per molecule and an alkyl group attached to the nitrogen atom having 10 to 18 carbon atoms per molecule, from 50% to 90% of the carboxylic groups of the acid component of the copolymer being neutralized.

As the monocarboxylic acid, arcylic acid has been found preferable. Methacrylic acid, or a mixture of methacrylic and acrylic acids, may be used, but the latter is preferred. It has been found that ethylacrylate (which is relatively hydrophilic) is superior to the more hydrophobic monomers, such as n-butyl acrylate or 2-ethyl hexyl acrylate. The use of the preferred monomers improves the water-solubility of the resultant polymer.

As previously stated, from 50% to 90% of the carboxyl groups on the acid component of the copolymer is to be neutralized in order to insure ready solubility of the composition. It has been found advantageous to neutralize 10 to 40% of the acid groups with caustic soda and 30 to 60% with a tertiary ethoxylated N-alkyl alkane diamine. It has been found particularly advantageous to neutralize the same number of acid groups with each of the two foregoing agents. As the degree of neutralization increases, the tack of the resultant composition is reduced.

The diamine acts as a neutralizing agent and also possesses tackifying properties. It is preferable that the alkyl group on the nitrogen atom have 12 to 18 carbon atoms. This acts as the hydrophobic component. The hydrophilic component constitutes the nitrogen atoms having polar ethylene oxide chains attached thereto.

Particularly suitable diamines are those of the formula

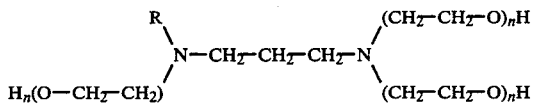

R is an alkyl radical having 10 to 18 carbon atoms (preferably 12 to 18 carbon atoms) and n is 1 to 6. It is preferred that R is hydrogen chains derived from natural fats and oils. Usually, palmityl, stearyl, and oleyl residues (saturated $C_{16}$ and $C_{18}$ and unsaturated $C_{18}$, respectively) together constitute about 90% of the substituents. There are also small quantities of lauryl, myristyl, pentadecyl, margaryl, myristoleyl, palmitoleyl, and linoleyl residues.

It is believed that the presence of the two amino groups in the diamine increases the cationic properties, so that the compound dissolves in water very easily because of the formation of hydrogen bonds between the water molecules and the ether and hydroxyl oxygen atoms, and also due to ionization. This combination of properties adds to the water solubility of the compound.

The composition of the present invention is produced by mixing the diamine with the copolymer. Ratios of 2:3 to 3:2 have been found useful, although it appears most advantageous to use a weight ratio of about 1:1. The pH is adjusted to about 6 to 7 by the addition of alkali, preferably in the form of 1 N caustic soda. A viscous solution is obtained which can be applied on one or both sides of a suitable support material, and then dried. If appropriate, the solution can be diluted to make coating easier. A wide variety of support materials can be used, but paper, fabric, non-woven material, or foil are particularly suitable. Coating takes place in the usual manner as is well known in the art. In the most preferred form of the invention, the composition is coated on both sides of paper fleece of pure cellulose or on a foil of water-soluble material. The former, after the composition is dissolved, becomes part of the recycled pulp. The latter is carried off with the liquid.

The presence of the diamine lowers the $T_g$ of the polyacrylate and imparts excellent tack to the composition. The diamine reacts with some of the free carboxyl groups of the copolymer to form substituted mono- and diammonium salts. Thus, it serves, not only as a plasticizer, but also as a cross-linking agent.

When shear strength was compared between the diamines of the present invention and the corresponding mono amines, it was found that the cross-linking produced by the diamines increased the cohesion of the resultant adhesive by a factor of 3.

If modification of the properties of the present compositions is desired, other water-soluble additives can be included in small quantities. Such materials as polyvinyl pyrrolidone, polyvinyl methyl ether and/or emulsifiers can be incorporated in the composition as needed.

The tapes produced in accordance with the present invention are particularly advantageous when compared with the prior art in that they exhibit an excellent tack and cohesion, and the adhesive layers dissolve readily in water without the necessity of any mechanical treatment and leave no residue. The invention operates in this manner even in the acidic pH range, as well as in alkaline and neutral environments. Moreover, it will even dissolve in the same manner in water containing alum.

The composition of the present invention will not precipitate after being dissolved in water even after stirring with a 10% alum solution (pH about 3), or after the addition of hydrochloric acid (pH about 0.5). Since the water used in the recycling process in paper mills often contains alum, this property is of major importance.

The tape and compositions of the present invention are also especially suitable in the manufacture of carbon paper using an endless web. In contrast to prior art compositions, the present invention does not neutralize the dye, so that the function of the paper is not impaired in the region of the gluing point.

For best results, the compositions of the present invention should be used between 20° and 30° C. and at a relative humidity of 50 to 60%. If the humidity rises to 90%, the cohesion of the composition decreases, but the tack increases. Conversely, if the relative humidity decreases to 20%, the cohesion of the composition increases, and the tack decreases.

The following examples are intended to illustrate more specifically the nature of the present invention.

EXAMPLES 1 to 6

Mixtures of (a) and (b) were prepared in accordance with the following in various ratios. These were adjusted with 1 N caustic soda to a pH value of about 7.0. This required 46 ml of 1 N caustic soda per 50 g of solid polymer. The resulting aqueous, alkali-containing, viscous solution was spread on book writing paper weighing 80 g/$_{m2}$. The composition was dried for 3 minutes at 70° C. The amount coated was such that, after drying, a thickness of about 30 g/$_{m2}$ was obtained.

A copolymer of ethyl acrylate and acrylic acid was prepared from 78% by weight ethylacrylate and 22% by weight of acrylic acid in the usual manner by radical solution polymerization in a mixture of acetone and ethanol. The polymer yield was 99.6%. The reduced viscosity ηspec./c or ηspec./c of the polymer was 1.562, measured in a Vogel-Ossag viscosimeter using a 1% solution of the polymer in ethanol at 25° C.

The diamines used were tertiary ethoxylated N-alkyl trimethylene diamine 3 (Diamine 3), tertiary ethoxylated N-alkyl trimethylene diamine 10 (Diamine 10), tertiary ethoxylated N-alkyl trimethylene diamine 15 (Diamine 15) and tertiary ethoxylated N-alkyl amine 5 (Monamine 5). The alkyl radical was derived from natural fats and oils as previously described. The numbers 3, 5, 10 and 15 indicate the number of ethylene oxide units per molecule. All of the diamines are known compounds and available commercially.

Adhesive tapes produced in accordance with the foregoing were tested by the usual methods for adhesivity to steel, shear strength, and tack. The results obtained are set forth in the following table.

| Example | 1 | 2 | 3 | 4 | 5 | 6 |
|---|---|---|---|---|---|---|
| Ethylacrylate-acrylic acid copolymer (wt. %) | 60 | 40 | 50 | 50 | 50 | 50 |
| Diamine 3 (wt. %) | — | — | — | — | 10 | — |

| Example | 1 | 2 | 3 | 4 | 5 | 6 |
|---|---|---|---|---|---|---|
| Diamine 10 (wt. %) | 40 | 60 | 50 | — | 20 | — |
| Diamine 15 (wt. %) | — | — | — | 50 | 20 | — |
| Monamine 5 (wt. %) | — | — | — | — | — | 50 |
| Adhesive strength/steel (N/cm) after AFERA 4001 | 2.8 | 7.7 | 5.9 | 5.3 | 6.2 | 7.8 |
| Shear strength (min) | 196 | 4 | 40 | 38 | 35 | 12 |
| Tack against coated raw paper | satisfactory (hard) | good | very good | very good | very good | very good |

The percentages refer to the pure solvent-free substances. In actuality, the polymer was used in the form of a solution of approximately 25% in a mixture of acetone and ethanol.

Shear strength was measured under static conditions at 22° C. against 75 g/$m^2$ coated raw paper. In all other respects the shear strength test was conventional. The load was 1 kp. and the adhered surface was 13 by 20 mm.

The tack was tested by preparing a sample strip of book writing paper 2 cm by 15 cm. It was coated with the composition and guided in the form of a loop in such a way that the adhesive composition touched the raw paper without any contact pressure. Upon lifting off the loop, the raw paper should split immediately when the tack is very good.

While only a limited number of embodiments of the present invention have been expressly described, such changes as would be apparent to the person of ordinary skill in the art may be made without departing from the scope or spirit thereof. The invention is to be broadly construed and not to be limited except by the character of the claims appended hereto.

What we claim is:

1. A water-soluble, pressure sensitive, self-adhesive composition comprising a mixture of
   (a) a copolymer comprising 70 to 80 parts by weight of monomeric ethyl acrylate and 30 to 20 parts by weight of a monomeric, α,β unsaturated aliphatic monocarboxylic acid and
   (b) a tertiary, ethoxylated N-alkyl alkane diamine having 3 to 18 ethylene oxide units per molecule, said alkyl having 10 to 18 carbon atoms,
   from 50% to 90% of the acid groups of said acid being neutralized.

2. A composition according to claim 1 wherein 10% to 40% of said acid groups are neutralized by caustic soda and 30% to 60% of said acid groups are neutralized by said tertiary ethoxylated N-alkyl alkane diamine.

3. A composition according to claim 1 wherein the weight ratio of (a) to (b) is 3:2 to 2:3.

4. A composition according to claim 3 wherein said ratio is about 1 to 1.

5. A composition according to claim 1 wherein said acid is acrylic acid, methacrylic acid or a mixture thereof.

6. A composition according to claim 5 wherein said acid is acrylic acid.

7. A composition according to claim 1 wherein said diamine is an ethoxylated N-alkyl trimethylene diamine.

8. A composition according to claim 1 wherein said alkyl comprises a mixture of palmityl, stearyl and oleyl.

9. A composition according to claim 1 wherein said alkyl has 12-18 carbon atoms.

10. A composition according to claim 1 wherein sodium hydroxide is present as alkali.

11. A composition according to claim 1 wherein said diamine is of the formula

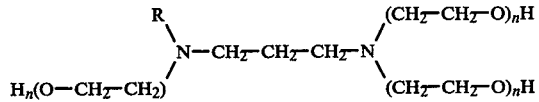

wherein R is alkyl having 10 to 18 carbon atoms and n=1 to 6.

12. A composition according to claim 11 wherein R is a mixture of hydrocarbon radicals derived from natural fats and/or oils.

13. A composition according to claim 12 wherein R contains about 90% palmityl, stearyl and oleyl.

14. A composition according to claim 13 wherein R also contains lauryl, myristyl, pentadecyl, margaryl, myristoleyl, palmitoleyl and/or linoleyl.

* * * * *